(12) United States Patent
Kats

(10) Patent No.: US 11,137,984 B1
(45) Date of Patent: *Oct. 5, 2021

(54) CLIENT-SIDE CACHING FOR CODE LANGUAGE SERVICES

(71) Applicant: Amazon Technologies, Inc., Seattle, WA (US)

(72) Inventor: Lennart Kats, Amsterdam (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,018

(22) Filed: Sep. 9, 2019

Related U.S. Application Data

(62) Division of application No. 15/788,477, filed on Oct. 19, 2017, now Pat. No. 10,409,561.

(51) Int. Cl.
| | |
|---|---|
| *G06F 8/33* | (2018.01) |
| *G06F 8/30* | (2018.01) |
| *G06F 16/2455* | (2019.01) |
| *G06F 8/36* | (2018.01) |
| *G06F 40/274* | (2020.01) |

(52) U.S. Cl.
CPC ............... *G06F 8/33* (2013.01); *G06F 8/30* (2013.01); *G06F 8/315* (2013.01); *G06F 8/36* (2013.01); *G06F 16/24552* (2019.01); *G06F 40/274* (2020.01)

(58) Field of Classification Search
None
See application file for complete search history.

(56) References Cited

U.S. PATENT DOCUMENTS

| | | | |
|---|---|---|---|
| 2005/0015747 A1* | 1/2005 | Zatloukal | G06F 8/33 717/109 |
| 2008/0270981 A1 | 10/2008 | Hutchison et al. | |
| 2012/0246610 A1* | 9/2012 | Asadullah | G06F 8/33 717/103 |
| 2013/0263086 A1 | 10/2013 | Carter et al. | |
| 2014/0359572 A1* | 12/2014 | Yuen | G06F 8/33 717/111 |
| 2016/0062745 A1 | 3/2016 | Rao et al. | |
| 2017/0083306 A1* | 3/2017 | Lincoln | H04L 67/2823 |

* cited by examiner

*Primary Examiner* — Lewis A Bullock, Jr.
*Assistant Examiner* — Mark A Gooray
(74) *Attorney, Agent, or Firm* — Lowenstein Sandler LLP

(57) ABSTRACT

A method and system for providing language services to a client system in a web-based code development environment. A set of code elements corresponding to a first code segment is stored in a local cache of the client system. In response to input of a character associated with the first code segment, a portion of the set of code elements corresponding to the character is displayed.

20 Claims, 5 Drawing Sheets

Code set at Time 1

Code set at Time 2 (after Time 1)

CLIENT-SIDE CACHING FOR CODE LANGUAGE SERVICES

CROSS-REFERENCE TO RELATED APPLICATION

This application is a divisional of U.S. patent application Ser. No. 15/788,477, filed on Oct. 19, 2017, titled "Client-side Caching for Code Language Services." The entirety of U.S. patent application Ser. No. 15/788,477 is hereby incorporated by reference herein.

BACKGROUND

Computer code language services, such as source code completion, are often implemented as part of an integrated development environment (IDE). A web-based IDE may include a programmer operating a client system operatively coupled to a web service configured to provide language services. Typically, a thin client system interacts with a server-side language engine over a series of client-server communications wherein the server provides the language services to the client. These client-server communications, or server round trip exchanges, create a high level of latency for the client and the server that leads to a detrimental customer experience.

In addition, the client system in a conventional IDE including web-based language services employs a language-specific parsing engine to parse the inputted source code to identify information in the code set for presentation to the server-side engine. However, the client-side parsing is time consuming for large code inputs and requires a full client-side implementation of the language-specific parser. Furthermore, to provide language services for multiple different coding languages, the client system maintains a different parsing engine for each of the different languages.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

Figure 1:
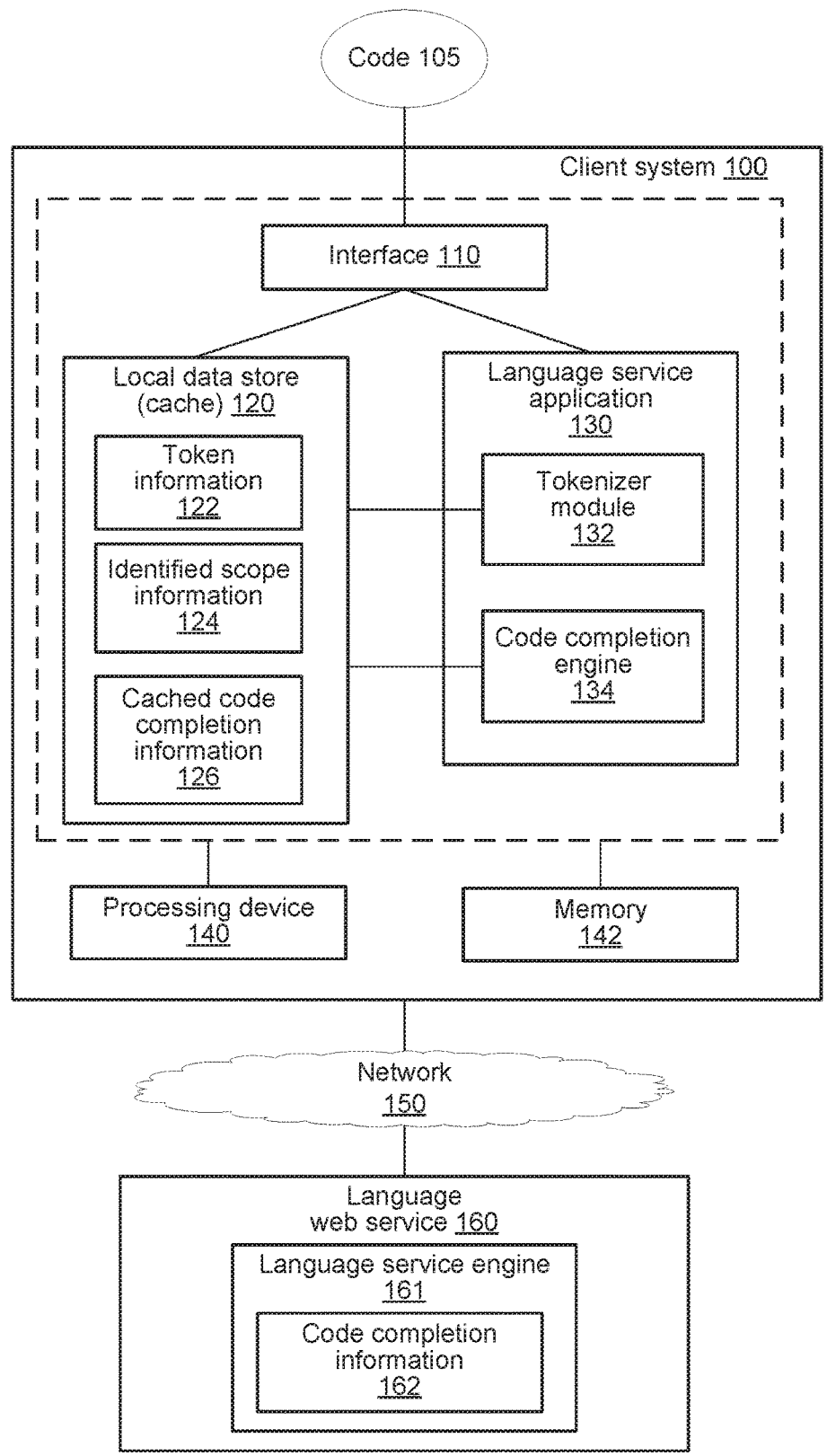
FIG. 1 illustrates an example code development environment including language services, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to systems and methods for providing language services to a client system in a web-based code development environment. In one embodiment, the client system (also referred to as the "client") includes a client-side local data store (herein referred to as "cache") storing code completion information received from a web service. In one embodiment, the code completion information includes a list of one or more code elements that may be displayed to a programmer as selectable options to complete a code element being inputted by the programmer. In one embodiment, the code element may be any character (e.g., letter, symbol, number, etc.) or character string recognized in the applicable coding language. In one embodiment, the code element may include a Java® variable (e.g., a local variable, an instance variable, a class/static variable).

In one embodiment, the client system executes an application (also referred to as the "language service application") to perform a tokenization process to source code inputted to the client system (e.g., via an interface such as a web browser). In one embodiment, the tokenization process includes a review of a set of code (also referred to as the "current code set") to identify one or more marker tokens. In one embodiment, a marker token is an element in the code language that denotes or indicates a start point or an end point of a segment of code. In one embodiment, a segment of code defined by a start marker token and an end marker token and including one or more code elements (e.g., a local variable, a field, etc.) is referred to as an "identified code segment" or an "identified scope".

In one embodiment, a string search may be performed on a code set to identify one or more start point marker tokens and end point marker tokens. In one embodiment, the tokenization process may be performed by a module configured to identify the start point marker tokens and end point marker tokens, without having "full" parsing capabilities needed to identify and parse all of the code in a particular code language.

In one embodiment, a code element (e.g., a local variable or field) and corresponding start point marker token and end point marker token are identified. For example, in the Java® language, the marker token may be the "{" symbol or character representing a start point marker token designating a start point of a code segment. In another example, the marker token may be the "}" symbol or character representing an end point marker token designating an end point of a code segment. In another example, the marker token may be an arrow operator (e.g., "→" or "←", representing a start point marker token and an end point marker token, respectively.

In one embodiment, the code element and marker token information (collectively the "token information") are stored in the cache of the client system. In one embodiment, the token information is used by the client system to send a request to a language web service executing on a server. In one embodiment, in response to the request, the language web service returns code completion information for storage in the local cache of the client system. In one embodiment, the code completion information includes a data structure (e.g., a table) including a list of symbols identified within the token information. For example, the code completion information includes a collection of symbols of the identified code segment (scope) including the local variable. In one embodiment, the server round trip including the communication exchange between the client system and the server enable the local storing of the code completion information in the cache of the client system (also referred to as the "cached code completion information").

In one embodiment, at a subsequent time following the identification of the code segment and caching of corresponding code completion information, the input of a new character is initiated via an interface of the client system. In one embodiment, the programmer may type a character beginning a new code element for which code completion (or other language service) may be performed. In one embodiment, upon detection of the input of the new character (also referred to as the "current input"), a determination is made that the character corresponds to a code element (e.g., a local variable) having the same scope as the previously identified scope. In one embodiment, upon determining the current scope corresponding to the currently inputted character matches the identified scope (also referred to as a "cache hit"), the application retrieves the cached code completion information from the local cache. In one embodiment, at least a portion of the cached code completion information (e.g., a list of options corresponding to the current input) is displayed via the interface to the user (e.g., the programmer). In one embodiment, an item of the displayed code completion information may be selected by the user to complete the code element beginning with the current input.

FIG. 1 is a block diagram illustrating an example code development environment including a client system 100 operatively coupled to a language web service 160 according to one embodiment. In one embodiment, the client system 100 includes an interface 110 (e.g., one or more computing elements (e.g., a keyboard, display, mouse, microphone, etc.) configured to access a web browser to operatively couple to the language web service 160) via a network 150. In one embodiment, the interface 110 is configured to receive one or more inputs (e.g., typed inputs received via a keyboard) corresponding to the development of code (e.g., source code) in a coding language (e.g., Java®). In one embodiment, the network 140 may be any suitable network, including, for example, the Internet, intranets, extranets, wide area networks (WANs), local area networks (LANs), wired networks, wireless networks, or other suitable networks, etc., or any combination of two or more such networks.

In one embodiment, the client system 100 includes a local data store or cache 120 and a language service application 130. In one embodiment, the language service application 130 includes a set of instructions that may be stored in a memory 142 and are configured for execution by a processing device 140 to perform various functionality relating to language tooling, as described detail below in connection with FIGS. 1-5.

In one embodiment, the language service application 130 includes a tokenizer module 132 and a code completion engine 134. In one embodiment, the tokenizer module 132 is configured to perform a tokenization process to a source code set inputted to the client system 100 (e.g., code 105) via the interface 110. In one embodiment, the tokenizer module 132 reviews a current code set and identifies one or more marker tokens (e.g., code language denoting a start point or an end point of a code segment or scope). In one embodiment, the segment of code defined by a start marker token (e.g., a "{" symbol in Java®) and an end marker token (e.g., an "}") and including one or more code elements (e.g., a local variable, a field, etc.) is referred to as an identified scope. In one embodiment, the tokenizer module 132 may be configured to apply a token definition (e.g., a set or library of marker tokens corresponding to a particular coding language) to the code 105 to identify a set of tokens within the code 105. Advantageously, in one embodiment the tokenizer module 132 provides an improved lightweight implementation that is built to tokenize a specific coding language, as compared to the robust client-side parsers employed by a conventional system. In one embodiment, the language service application 130 may include multiple tokenizer modules 132 each configured for a particular coding language (e.g., a first tokenizer module for a first coding language, a second tokenizer module for a second coding language, etc.).

In one embodiment, the tokenizer module 132 tokenizes the code input 105 to generate token information 122 for storage in the local cache 120 of the client system 100. In one embodiment, the local cache 120 may be part of the memory 142. In one embodiment, the tokenizer module 132 identifies one or more scopes with the code 105 based on the token information 122. In one embodiment, a scope is identified as a set of marker tokens and code elements within a start point marker token and an end point marker token. In one embodiment, the identified scope information 124 is stored in the local cache 120 of the client system 100.

In one embodiment, the code completion engine 134 uses the identified scope information (e.g., a set of one or more code elements (e.g., a local variable) identified within the start point marker token and the end point marker token) to determine if there is a matching set of cached code completion information 126. In one embodiment, during a first processing, the code completion engine 134 determines that no code completion information has been cached that corresponds to the identified scope information 124, and communicates with the language web service 160 to obtain code completion information corresponding to the identified scope (e.g., the code completion information 162). In one embodiment, the language web service 160 includes a language service engine 161 configured to generate the code completion information 162 for provisioning to the client system 100. In one embodiment, the language service engine 161 may be configured to provide one or more language services corresponding to a particular code language. In one embodiment, the communication exchange between the client system 100 and the language web service 160 via network 150, or server round trip, includes a request for the code completion information 162 from the code completion engine 134 of the client system (including the identified scope information 124) and a response from the language web service 160 including the code completion information 162 corresponding to the identified scope information 124.

In one embodiment, the language web service 160 uses the identified scope information 124 to generate a data structure corresponding to the code completion information

162. In one embodiment, the data structure may be a Java® symbol table including a listing of symbols in the corresponding code language.

In one embodiment, the code completion information is stored in the cache 120 of the client system 120. In response to a subsequent input of a character of the code 105, a second processing is performed by the code completion engine 134. In one embodiment, in response to the typing of a character at a first location, the code completion engine 134 determines if the character corresponds to a code element (e.g., a local variable). In one embodiment, upon determining the character corresponds to a code element for which completion options may be generated, the code completion engine 134 determines a scope corresponding to the character. In one embodiment, the scope corresponding to the character is determined by identifying a start point marker token (e.g., by reviewing a segment of the code to the left of the identified or current character until identifying the corresponding start point marker token) and an end point marker token (e.g., by reviewing a segment of the code to the right of the identified character until identifying the corresponding end point marker token defining the corresponding scope). In one embodiment, having identified a scope of the character (also referred to as the "current scope"), the code completion engine 134 determines if the current scope is the same as the identified scope (e.g., the scope identified during the first processing).

In one embodiment, in view of the determination of a match between the cached identified scope information and the current scope (also referred to as a "cache hit"), the code completion engine 134 retrieves the cached code completion information 126 for display to a user. In one embodiment, the cached code completion information 126 is displayed via the interface 110 of the client system and includes one or more selectable options for completion of the code element beginning with the character entered as the current input. For example, if the current input is the character "f", the code completion engine 134 retrieves the cached code completion information 126 and extracts a portion (e.g., a list) corresponding to all code elements beginning with the character "f" and displays the identified portion via the interface 110.

Although FIG. 1 is described in connection with an exemplary embodiment wherein the language service relates to code completion, other or additional language services may be provided by the language services application 130. For example, the language services application 130 may be configured to generate a graphical user interface element (e.g., a hover box) corresponding to a code element (e.g., Windows® Tooltips, Windows® Infotips, or a hint generator relating to a code element) and/or reference resolution (e.g., a process of associating a dependency graph between files, and generating a sorted list of files). In one embodiment, the language web service 160 may be configured to provide information relating to the other language tooling services to the client system 100 for storage in the local cache 120, as described above in connection with the code completion service. In one embodiment, the client system 110 may store the language service information (e.g., code completion information, Windows® Tooltips, Windows® Infotips information, reference resolving information, etc.) in the local cache and use the cached information upon identifying a current scope matches a previously identified scope associated with the cached information.

Figure 2:
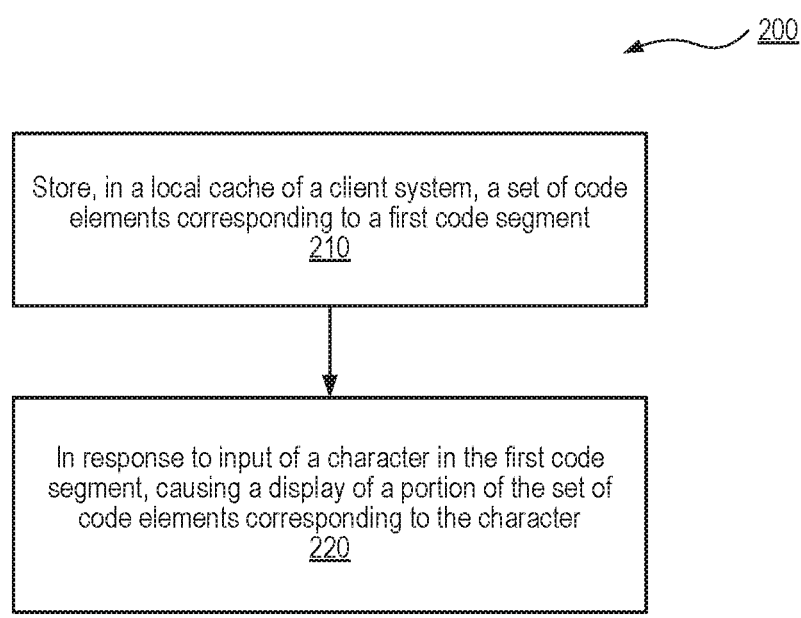
FIG. 2 is a flow diagram illustrating an example method of providing language services in a code development environment, according to one embodiment.

FIG. 2 illustrates a flowchart that provides an example of a process 200 executed by a client system (e.g., client system 100 of FIG. 1) operatively coupled to a web service (e.g., language web service 160 of FIG. 1) in a code development environment language, according to various embodiments. It is understood that the flowchart of FIG. 2 provides an example of the many different types of functional arrangements that may be employed to implement the operation of the client system including a language service application (e.g., language service application 130 of FIG. 1) described herein. Process 200 may be performed by a processing logic that may comprise hardware (e.g., circuitry, dedicated logic, programmable logic, microcode, etc.), software (e.g., instructions run on a processing device, such as processing device 140 of FIG. 1), or a combination thereof.

In one embodiment, during a first processing, a first code segment (or first scope) associated with code inputted via the client system is identified. In one embodiment, the identified scope corresponds to a code segment of a software program being developed using the client system. In the first processing, the identified scope information is sent to a web service as a request for corresponding language service information (e.g., code completion information). In one embodiment, the client system receives the code completion information associated with the first identified scope from the web service, in response to the request. In one embodiment, the code completion information includes a set of code elements (e.g., local variables, fields, etc.) in the associated code language (e.g., Java®) that correspond to the first identified scope.

In block 210, the client system stores the set of code elements (e.g., the code completion information received from the web service) in a cache of the client system. In one embodiment, the set of code elements corresponds to the first code segment (e.g., the first identified scope) of the code.

In block 220, in response to input of a character in the first code segment (e.g., the first identified scope), a portion of the set of code elements corresponding to the character is displayed. In one embodiment, the portion of the set of code elements includes the one or more candidate code elements that begin with the same letter as the inputted or current character. For example, if the character is the letter "f", a display is generated including a list of all of the code elements in the set of code elements that begin with the letter "f", such as, for example, "foo", "f1234", "f5678", etc. In one embodiment, a graphical window or box is displayed via an interface to a programmer, such that the programmer may indicate a selection of one of the candidate code completion options to complete the code element beginning with the currently typed character "f".

In one embodiment, in block 220, the language service application of the client system recognizes that the current character is within the same scope as the previously identified scope and retrieves the previously cached code completion information. Advantageously, by storing the code completion information in the local cache, the client system avoids a server round trip in response to the input of the new or current character, thereby improving processing time and reducing network bandwidth consumption.

Figure 3:
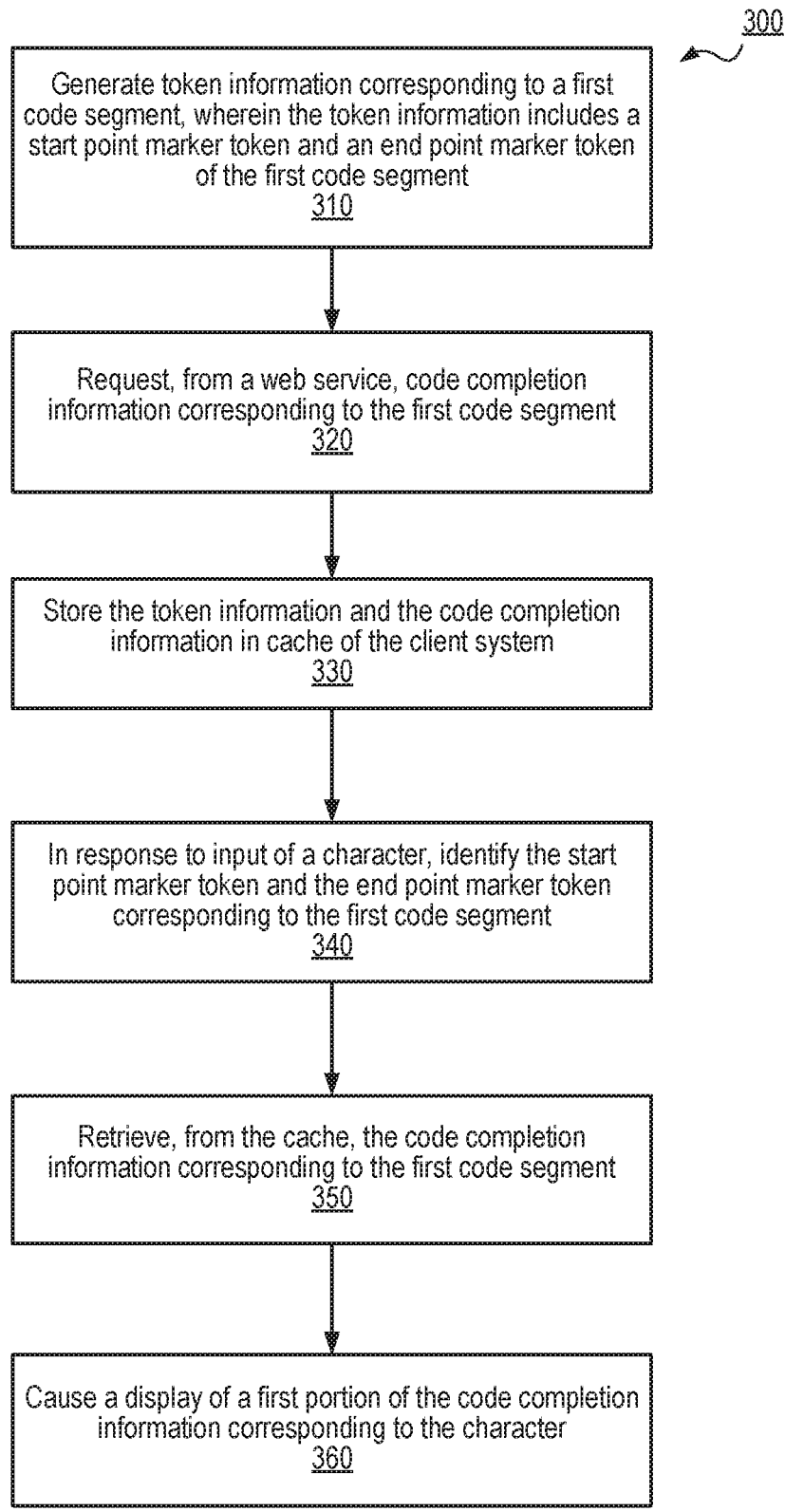
FIG. 3 is a flow diagram illustrating an example method of providing language services in a code development environment, according to one embodiment.

FIG. 3 illustrates a flowchart that provides an example of a process 300 executed by an application (e.g., the language service application 130 of FIG. 1) to provide one or more language services in a code development environment. The process 300 is described using an example code completion service, however, other language services may be provided according to the described methodology.

In block 310, the application reviews a first code segment and generates token information for the code language. In one embodiment, the token information includes identifying information associated with a start point marker token (e.g., a marker token denoting a start point of a logical scope, such as the "{" symbol in Java®) and an end point marker token (e.g., a marker token denoting an end point of a logical scope in the code language, such as the "}" symbol in Java®). In one embodiment, the application includes a tokenizer module that is configured to review and identify marker tokens using a token definition corresponding to a particular code language. Advantageously, the application may be configured to execute a respective tokenizer module (e.g., a set of instructions for tokenizing the code) corresponding to each particular code language. In one embodiment, the application may have a lightweight construct maintaining the one or more tokenizer modules for the one or more relevant code languages. For example, if the input code is in a first code language, such as Java®, the application may include a tokenizer module configured to apply tokenizing rules, libraries, etc. relating to the first code language (e.g., and not employ a full-scale, robust language-independent code parser).

In one embodiment, the application may check to determine if any stored code completion information is stored in cache for the first code segment. In one embodiment, during an initial processing, if no match is found, the application determines the check results in a cache miss and proceeds to block 320. In block 320, the application sends a request to a web service for code completion information corresponding to the first code segment. In one embodiment, the request may be communicated via an interface of the client system (e.g., a web browser) over a network to the web service. In one embodiment, the web service maintains code completion information corresponding to the code language of the first code segment. In one embodiment, the code completion information includes a set of code elements of the code language that may be used to complete a partially-inputted code string.

In block 330, the client system stores the token information and the code completion information in a local data store (cache) of the client system. In one embodiment, the token information includes the identified marker tokens and the first identified scope. In one embodiment, the cache may maintain the token information in association with the code completion information, such that the code completion information may be retrieved in response to the identification of a same logical scope as the first identified scope, as described below.

In block 340, as a new character is inputted via the interface, a determination is made whether the new character (e.g., the current character relating to a local variable) is within the same scope as the first identified scope. In one embodiment, to determine the scope of the current character, a start point marker token and an end point marker token corresponding to current character are identified. In one embodiment, using the stored token information, starting from a location of the current character (e.g., location "X"), a code segment to the right of the location is reviewed until an end point marker is identified. In one embodiment, using the stored token information, starting from location X, a code segment to the left of location X is reviewed until a start point marker token is identified.

In one embodiment, a code portion preceding the code segment bound by the identified start point marker token and the end point marker token is examined to determine if there is a match with the previously identified code segment of the first identified scope. For example, if a code portion preceding the start point marker token of the currently identified code segment is the same as the code portion preceding the start point marker token of the first identified scope, a determination is made that the current character has been entered in the same scope (e.g., the first code segment).

In block 350, having determined that the current character is within the same scope as the previously identified scope, the code completion information corresponding to the first code segment is retrieved from the cache of the client system. In one embodiment, by determining the current character is within the same scope, the corresponding code completion information stored in the cache is validated. In one embodiment, by retrieving the code completion information from the cache of the client system, a server round trip associated with completion services for the current character is avoided.

In block 360, the application causes a display of a first portion of the code completion information. In one embodiment, the first portion of the code completion information corresponds to the current character. For example, if the current character is "f", the first portion of the code completion information includes the code elements that begin with the character "f". In one embodiment, the display of the first portion of the code completion information may include an interactive box or window configured to receive an indication of a selection of a desired code completion option.

Figure 4:
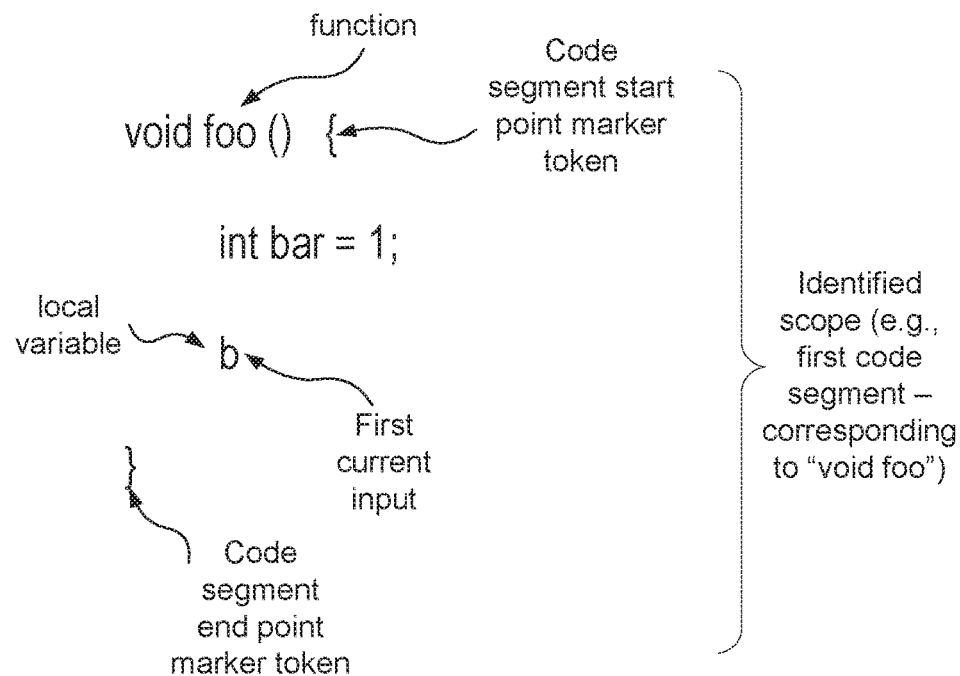
FIG. 4 illustrates an example application of language services including code completion, according to one embodiment.
Figure 4:
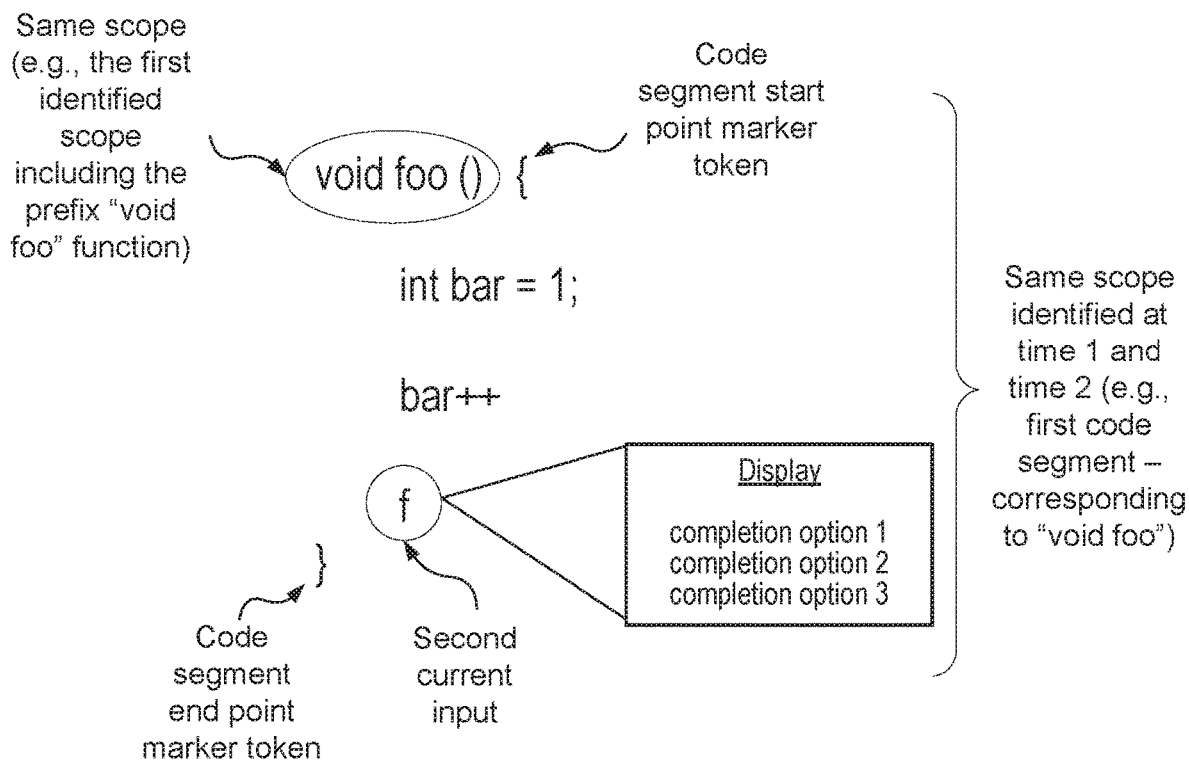

FIG. 4 illustrates an example of code in the Java® language processed according to the methods and systems described herein, according to one or more embodiments. FIG. 4 illustrates a first code set processed by an application (e.g., language service application 130 of FIG. 1) at a first time. In this example, at the first time, upon entry of the character "b" (identified in FIG. 4 as the "first current input") associated with a local variable, the local cache of the client system is checked to see if corresponding code completion and scope information are stored. In this example, at the first time, since no related information is cached, the application requests code completion information from a web service executing on a server (e.g., language web service 160 of FIG. 1).

In one embodiment, at time 1, the application identifies a current scope of the first current input as denoted by the code segment start point marker token (e.g., "{" in FIG. 4) and the code segment end point marker token (e.g., "}" in FIG. 4). In one embodiment, the current scope information includes a code segment preceding the start point marker token (e.g., a prefix code segment). In this example, the prefix code segment including the function "void foo ( )" is identified as part of the identified scope information and stored in cache with the code completion information returned from the web service.

As shown in FIG. 4, at a time following time 1 (e.g., at time 2), the application detects the entry of a second current input "f" for which code completion services are to be executed. In one embodiment, a scope corresponding to the character "f" is determined and compared to the previously identified scope information (e.g., the scope information identified at time 1). As shown, a prefix or portion of the code preceding the start point marker token associated with the second current input (e.g. "void food ( )") is the same as the prefix code segment of the first identified scope. In one embodiment, as a result, the application determines that the second current input has the same approximate scope as the first identified scope (e.g., a cache hit). In one embodiment, having determined a cache hit, the application retrieves the code completion information corresponding to the first identified scope and causes a display of a portion of the code completion information.

As shown, the display may include a list of code completion options (e.g., "completion option 1", "completion option 2", and "completion option 3" shown in FIG. 4). In one embodiment, the portion of the code completion information that is displayed includes the one or more code elements that begin with the character "f", such as "foo". In one embodiment, a user (e.g., a programmer) may select from the list of completion options to complete the currently inputted code (e.g., the local variable in Java®), without the programmer having to type additional characters of the code element.

Figure 5:
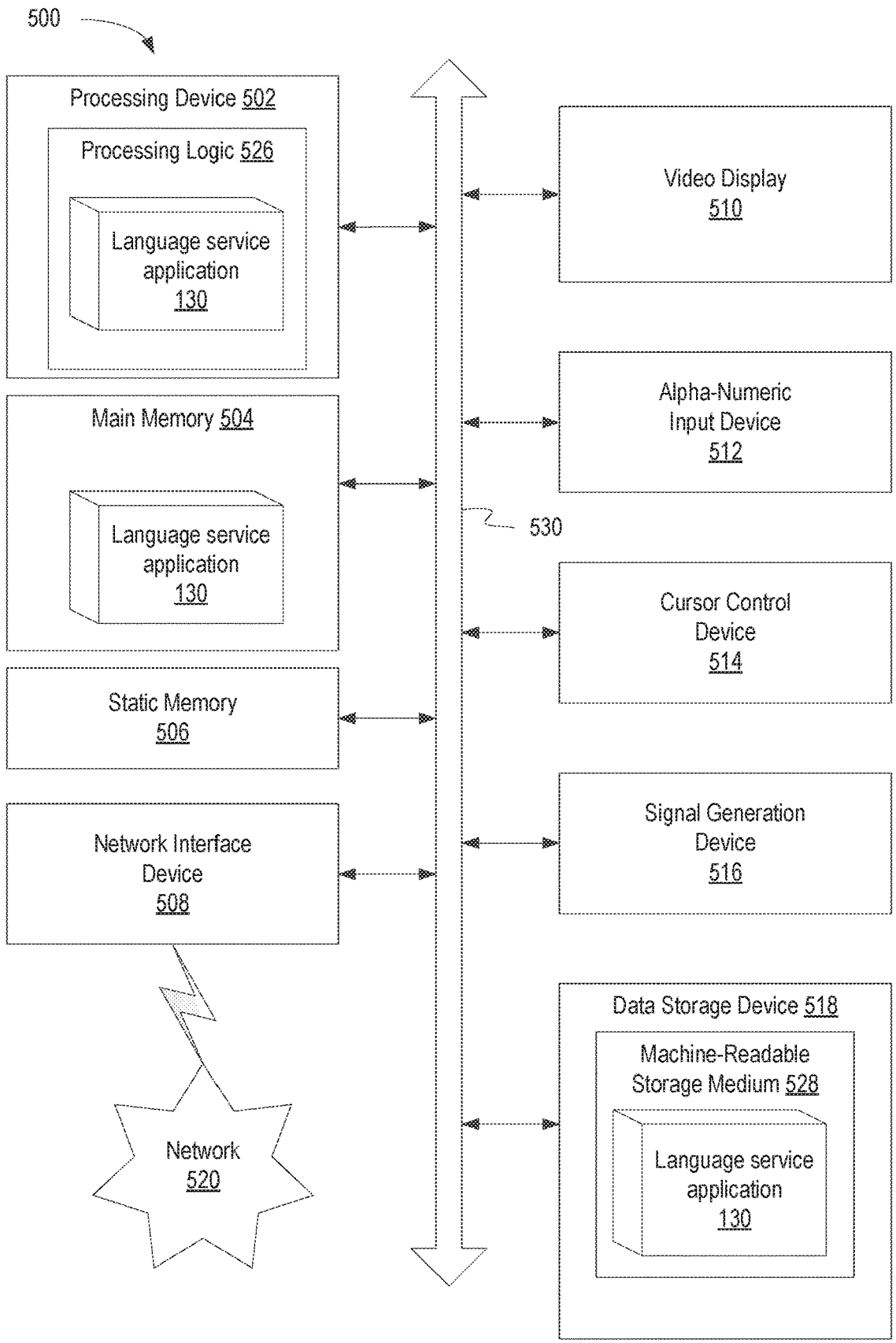
FIG. 5 is a schematic block diagram that provides an example illustration of a computing environment executing instructions relating to providing language services, according to one embodiment.

FIG. 5 illustrates a diagrammatic representation of a machine in the example form of a computer system 500 including a set of instructions executable by a language service application 130 to cause the system to perform any one or more of the methodologies discussed herein. In one embodiment, the language service application 130 is executed on a client system in a code development environment including a web service providing language tooling. In one embodiment, the language service application 130 may include instructions to enable execution of the processes and corresponding components shown and described in connection with FIGS. 1-4.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for the language service application 130 for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions of the access management system 100 embodying any one or more of the methodologies or functions described herein. The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "storing", "causing", "generating", "requesting", "retrieving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
a processing device; and
a memory to store computer-executable instructions that, if executed, cause the processing device to:
review a first code segment of a code set;
generate token information corresponding to the first code segment to identify a first start point marker token, a first end point marker token, and one or more code elements within the first code segment;
request, from a web service, code completion information comprising a set of code elements corresponding to the first code segment using the token information;
store, in a local cache of a client system, the set of code elements corresponding to the first code segment and the token information corresponding to the first code segment;
in response to input of a character associated with a current code segment, identify, in view of the first start point marker token preceding the character and the first end point marker token following the character, a match between the current code segment and the first code segment;
cause, in view of the match, a display of at least a portion of the set of code elements corresponding to the character; and
cause completion of the current code segment using a selected code element of the at least the portion of the set of code elements.

2. The system of claim 1, wherein the set of code elements are received from the web service.

3. The system of claim 1, wherein the portion of the set of code elements comprise one or more code completion options corresponding to a code language associated with the character of the first code segment.

4. The system of claim 1, wherein the at least the portion of the set of code elements comprise one or more code completion options corresponding to a code language.

5. The system of claim 4, wherein the processing device is further to retrieve the portion of the set of code elements from the local cache.

6. The system of claim 1, wherein the character corresponds to a local variable having a local scope in the first code segment.

7. The system of claim 1, wherein the processing device is further to determine the character has a scope corresponding to the first code segment.

8. The system of claim 1, wherein the first start point marker token comprises a symbol representing a start point of the first code segment corresponding to a code language.

9. A method comprising:
reviewing a code segment of a code set;
generating token information corresponding to the code segment to identify a first start point marker token, a first end point marker token, and one or more code elements within the code segment;
storing the token information in a local cache of a client device;
determining, using the token information, that code completion information comprising a set of code elements corresponding to the code segment is stored in the local cache of the client device;
in response to input of a character associated with a current code segment, identifying, in view of the first start point marker token preceding the character and the first end point marker token following the character, a match between the current code segment and the code segment;
causing, in view of the match, a display of at least a portion of the set of code elements corresponding to the character; and
completing the current code segment in view of a selection of an item from the first at least the portion of the set of code elements.

10. The method of claim 9, wherein the at least the portion of the set of code elements comprise one or more code completion options corresponding to a code language.

11. The method of claim 9, wherein the character corresponds to a local variable having a local scope in the code segment.

12. The method of claim 9, further comprising retrieving, from the local cache, the code completion information corresponding to the code segment.

13. A non-transitory computer-readable storage device storing computer-executable instructions that, if executed by a processing device, cause the processing device to:
generate token information corresponding to a first code segment to identify a first start point marker token, a first end point marker token, and one or more code elements within the first code segment;

store the token information in a local cache of a client device;

determine, using the token information, that code completion information comprising a set of code elements corresponding to the first code segment is stored in the local cache of the client device;

in response to input of a character associated with a current code segment, identify, in view of the first start point marker token preceding the character and the first end point marker token following the character, a match between the current code segment and the first code segment;

cause, in view of the match, a display of a portion of the set of code elements corresponding to the character; and cause completion of the current code segment using a selected code element of the at least the portion of the set of code elements.

14. The non-transitory computer-readable storage device of claim 13, wherein the code completion information stored in the local cache is received from a web service.

15. The non-transitory computer-readable storage device of claim 13, wherein the portion of the set of code elements comprises one or more code completion options corresponding to a code language.

16. The non-transitory computer-readable storage device of claim 15, wherein the first start point marker token comprises a first symbol representing a start point of the first code segment in a code language and the first end point marker token comprises a second symbol representing an end point of the first code segment corresponding to the code language.

17. The non-transitory computer-readable storage device of claim 16, wherein the processing device is further to retrieve the at least the portion of the set of code elements from the local cache.

18. The non-transitory computer-readable storage device of claim 13, wherein the character corresponds to a local variable having a local scope in the first code segment.

19. The non-transitory computer-readable storage device of claim 13, wherein the processing device is further to determine the character has a scope corresponding to the first code segment.

20. The non-transitory computer-readable storage device of claim 13, wherein the processing device is further to transmit a communication to a web service to request the code completion information.

* * * * *